Aug. 13, 1940.　　　　　F. F. VOGEL　　　　　2,211,394
DEVICE FOR INDICATING FREEZING TEMPERATURE OF LIQUIDS
Filed April 16, 1938
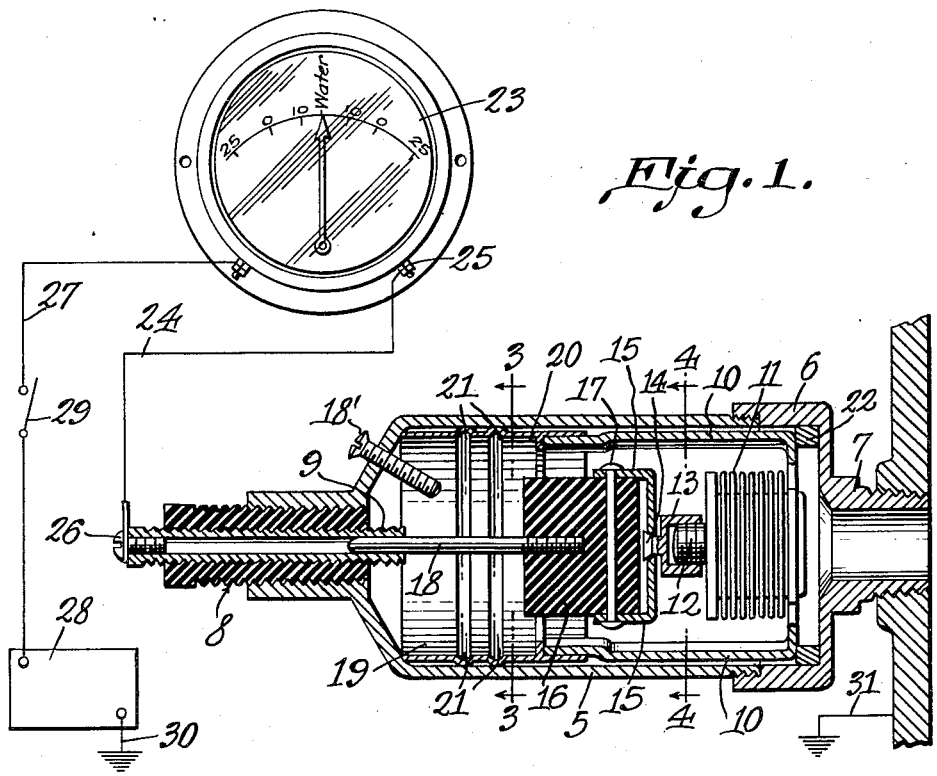
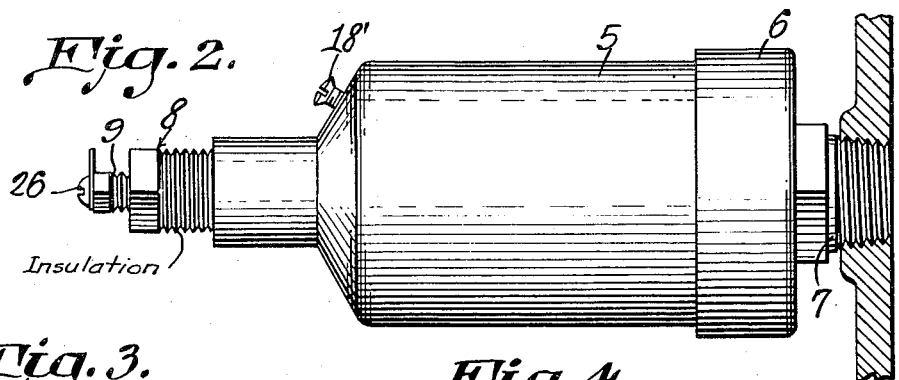
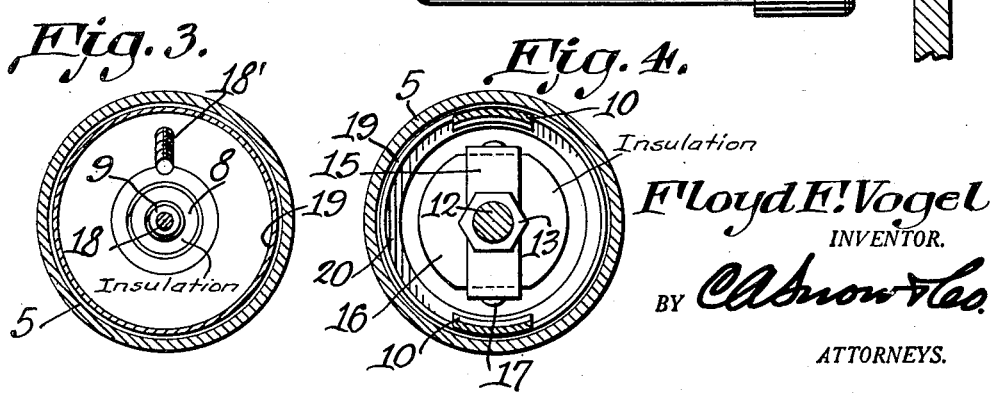
Floyd F. Vogel
INVENTOR.
BY
ATTORNEYS.

Patented Aug. 13, 1940

2,211,394

UNITED STATES PATENT OFFICE 2,211,394

DEVICE FOR INDICATING FREEZING TEMPERATURE OF LIQUIDS

Floyd F. Vogel, Manito, Ill.

Application April 16, 1938, Serial No. 202,553

1 Claim. (Cl. 175—183)

By way of explanation, it might be stated that in most internal combustion engines, and particularly motor vehicle engines, a cooling liquid is circulated between a radiator and the water jacket of the motor for maintaining the motor cool, during operation.

The cooling liquid is usually water, therefore during the winter months, it is necessary to add a liquid such as alcohol, glycerine or commercial anti-freeze liquids having a freezing point much lower than water, to insure against the cooling liquid freezing. Since the anti-freeze materials added to the cooling liquid necessarily have a specific gravity different from that of water, the freezing point or density of the cooling liquid may be readily ascertained, by the apparatus forming the subject matter of this invention, and since the material mixed with the cooling water is frequently lost, due to evaporation or leakage, it is important that the operator be informed at all times as to the anti-freeze qualities of the cooling liquid.

It is therefore the primary object of the present invention to provide an apparatus which may be permanently installed on the usual motor vehicle and under the control of the operator for accurately testing the specific gravity of the cooling liquid, to determine the anti-freeze qualities of the liquid.

A further object of the invention is the provision of a device of this character which is electrically controlled and actuated by an electric current passed through the cooling liquid, the indicator of the device being mounted where it may be readily observed by the operator, as for example on the instrument board of the conventional motor vehicle.

A still further object of the invention is to provide a device which will automatically adjust itself according to the variation in the density of the cooling liquid, caused by temperature changes, to the end that an accurate test may be completed, regardless of the temperature of the cooling liquid of the motor.

Another important object of the invention is to provide a testing apparatus which may be readily adjusted or set for use with cooling liquids wherein various types of anti-freeze materials have been added.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

Referring to the drawing:

Figure 1 is a longitudinal sectional view through the body portion of the device, and illustrating the electrically controlled indicator as in circuit therewith.

Figure 2 is a side elevational view of the device.

Figure 3 is a vertical sectional view taken on line 3—3 of Figure 1.

Figure 4 is a sectional view taken on line 4—4 of Figure 1.

Referring to the drawing in detail, the device comprises a housing including the main body portion 5 and supporting section 6, the supporting section 6 being provided with a threaded extension 7 adapted to be positioned in a threaded opening of a cylinder block, providing communication between the water jacket of the cylinder block and the body portion.

As shown, the body portion 5 is removably supported in the section 6, so that the device may be readily and easily disassembled for adjustment or repairs.

The outer end of the body portion 5 is reduced and formed with internal threads to receive the external threads of the member 8, which is constructed of suitable insulating material. The member 8 is formed with a longitudinal bore in which the threaded tube 9 is adjustably held, the threaded tube 9 having its inner end extended into the body portion, as shown by Figure 1 of the drawing. The reference character 10 designates a substantially U-shaped support to which the coil 11 is secured, the coil being sensitive to the action of heat and cold, provides the thermostat control, for the device. The coil 11 includes a threaded extension 12 over which the cap 13 extends, the cap 13 being also formed with an extension 14 fitted in an opening of the yoke 15 that provides a support for the block of insulating material 16, the insulating material 16 being secured within the yoke, by means of the headed pin 17.

Secured in the block of insulating material 16, is an electrode 18, the free end of the electrode extending into the tube 9 in such a way that the electrode 17 may move freely longitudinally of the tube 9.

An adjusting screw indicated by the reference character 18' operates through a threaded opening in the body portion 5, and has its free end arranged in the path of travel of the block of insulating material 16, to the end that when the coil 11 expands, under the heat of the liquid passing into the block 16 the block will engage the inner end of the adjusting screw 18', restricting further movement of the insulating block. Thus it will be seen that due to this construction, undue strain which would ordinarily be directed to the coil 11, will be eliminated.

Mounted within the body portion 5, is a sleeve 19 that is formed with an inwardly extended annular flange 20 spaced from the inner end of the sleeve. The free ends of the U-shaped support 10, extend into the sleeve 19, the inner extremities of the support 10 contacting with the annular flange 20, restricting movement of the U-shaped support 10, with respect to the sleeve and body portion. Enlargements indicated at 21 are formed on the sleeve and frictionally engage the inner surface of the body portion 5, holding the sleeve in position.

A gasket indicated by the reference character 22 is positioned in the body portion 5, and provides a support against which the member 10 rests, holding the member 10 in spaced relation with the supporting section 6, so that water may circulate freely, through the body portion.

The reference character 23 designates the indicator which is supported on the instrument board of the motor vehicle, the indicator being in the form of the usual ammeter. Wire 24 which has connection with the post 25 of the ammeter, is connected to the tube 9, by means of the screw 26. The return wire of the circuit is indicated by the reference character 27, and as shown leads to the battery 28 of the vehicle. A switch indicated at 29 is provided in the circuit, and may constitute the usual ignition switch of a motor vehicle circuit, to the end that when the ignition switch has been turned on, the ammeter will indicate continuously, while the motor is operating. The ground wire is indicated by the reference character 30, and the body portion 5 is grounded as at 31.

Owing to the fact that the conductivity of the cooling liquid is decreased when the cooling liquid is cold, it is obvious that a greater portion of the electrode 17 should be exposed to the action of the cooling liquid, in order to insure an accurate reading of the indicator 23. As the cooling liquid becomes heated, due to the action of the running motor, it is obvious that a smaller portion of the electrode 17 should be exposed to the action of the cooling liquid, in order to obtain an accurate reading. Due to the construction shown and described, it will be obvious that as the cooling liquid heats, the coil 11 will expand, moving the electrode 17 into the tube 9 decreasing the length of the electrode exposed to the action of the cooling liquid.

It might be further stated that since various anti-freeze solutions act to increase or decrease the conductivity of the cooling liquid, by adjusting the tube 9, the device may be regulated to insure an accurate reading, regardless of the anti-freeze solution used in the cooling liquid. For example, alcohol increases the conductivity of the cooling liquid, while the various well known anti-freeze solutions containing glycerine, decrease the conductivity of the cooling liquid.

With a device such as shown and described, mounted on an engine block, the operator of a motor vehicle may at a glance, readily determine the condition of the anti-freeze solution in the cooling liquid of the motor.

I claim:

In a device of the class described, a conductivity cell comprising a body portion adapted to be secured to an engine cylinder and in communication with the water jacket thereof, a coil sensitive to heat and cold mounted within the body portion, a tube extending into the body portion, an electrode supported by the coil, the free end of the electrode extending into the tube, and said coil adapted to move the electrode within the tube varying the length of electrode exposed to the liquid in said body portion, and said body portion and electrode adapted to be placed in an electric circuit including an ammeter whereby the conductivity of the liquid within the body portion will be registered on the ammeter when the circuit is completed.

FLOYD F. VOGEL.